June 16, 1925.

T. S. McLENDON

POULTRY NEST

Filed Aug. 23, 1923

1,542,156

Inventor
Thomas S. McLendon
By Franks Appleman
Attorney

Patented June 16, 1925.

1,542,156

UNITED STATES PATENT OFFICE.

THOMAS S. McLENDON, OF CARROLLTON, GEORGIA.

POULTRY NEST.

Application filed August 23, 1923. Serial No. 658,988.

*To all whom it may concern:*

Be it known that I, THOMAS S. MCLENDON, a citizen of the United States of America, and resident of Carrollton, in the county of Carroll and State of Georgia, have invented certain new and useful Improvements in Poultry Nests, of which the following is a specification.

This invention relates to poultry and particularly to poultry nests.

An object of this invention is to produce a nest and a trap for eggs which will receive the eggs successively and deliver them to a collector from whence they may be readily removed without subjecting the eggs to the presence of the succeeding poultry that may occupy the nest.

It is a further object of this invention to provide means which will prevent fouling of the eggs after they have been laid, or their fracture, due to the presence of the poultry in the nest.

It is a further object of this invention to produce a nest of the character indicated in which the weight of the egg deposited will automatically operate a mechanism to transfer the egg to the collector, the said mechanism being reset by gravity after the eggs has been discharged from said mechanism.

It is also an object of this invention to produce a nest of the character indicated which can be readily cleaned and which comprises comparatively few, inexpensive parts of durable construction.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
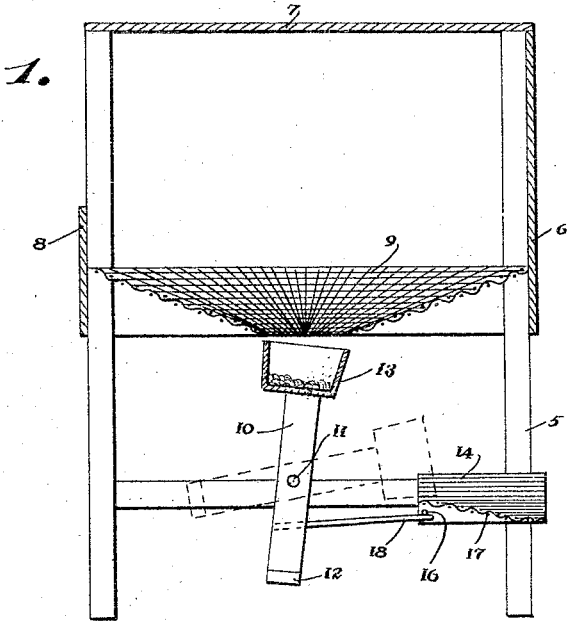
Figure 1 illustrates a sectional view of a nest embodying the invention.
Figure 2:
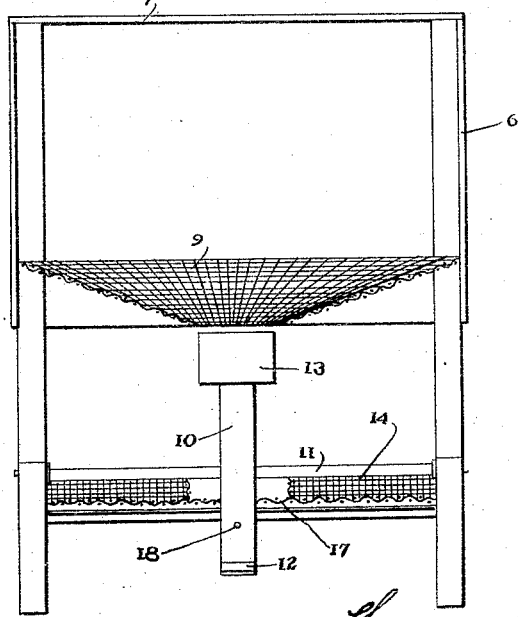
Figure 2 illustrates a sectional view of the nest at right angles to that shown in Figure 1, the parts of the device being shown in elevation.

In these drawings 5 denotes a suitable frame having sheathing 6 on the top 7 of any appropriate material or type, the said frame being open at one side except for a shield 8 which may be provided to give a certain amount of seclusion to the poultry using the nest.

The poultry support or nest proper comprises a shelf-like foraminous body 9 with inwardly sloping bottom leading to an opening 10 at the center thereof, in order that eggs deposited on the shelf or member 9 will gravitate toward the opening and discharge from the nest therethrough.

A standard 10 is oscillatably mounted on a pivot 11 and the said standard is normally in an approximate vertical position and preferably the lower end of the standard is provided with a weight 12 which is heavier than the cup or receiver 13 on the upper end of the standard, or the proportions of the standard could be so arranged that its greater length would be below the pivot and its weight would be such as to overcome the weight of the cup. In any event, the construction should be such that the standard would swing from the full line position in which it is shown in Figure 1 to the dotted line position thereof when the egg is deposited in the cup, it being understood that the weight of the eggs should overbalance the weight of that portion of the standard below the pivot in order that the standard will swing to the dotted line position to deposit an egg in the collector 14 which is stationed in such position with relation to the standard as to cause the cup to project within the area of the collector or into such operative relation thereto as to permit the collector to receive an egg discharged from the cup.

The standard is provided with an arm 18 rigid therewith and it projects so that it will be engaged by a stop or arresting element 16 carried by the collector. Action of the arm arrests the standard when it is nearly vertically positioned and it prevents the standard from assuming a position that will interfere with its operation when an egg is deposited in the cup.

Preferably the collector 14 is provided with a screen bottom 17 which will have sufficient yielding action to prevent injury to the eggs as they are deposited thereon or travel thereover. The bottom is also in an inclined position in order that the eggs will roll down the bottom of the collector and produce a clearance for the reception of the succeeding eggs.

I claim:

In a poultry nest, a frame, a floor therein forming a nest proper comprising a foraminous body inclined toward the center and apertured at its approximate center, a substantially vertical support oscillatably mounted under the opening of the floor and having a greater weight below the pivot whereby the said support is held normally approximately vertically, a cup on the upper end of the support adapted to receive eggs issuing from the opening in the floor, a yieldable collector with relation to which the cup is operative for delivering eggs to the collector, an arm extending laterally of the support and carried thereby, and an arresting element on the collector in the path of travel of the arm for arresting the said arm and retaining the support in normal position.

THOMAS S. McLENDON.